Sept. 8, 1959  E. W. HOWARD  2,903,419
HYDROCARBON CONVERSION SYSTEM
Filed Feb. 10, 1955  3 Sheets-Sheet 2

FIG. IA

INVENTOR.
EVERETT W HOWARD
BY
ATTORNEYS

Sept. 8, 1959 E. W. HOWARD 2,903,419
HYDROCARBON CONVERSION SYSTEM
Filed Feb. 10, 1955 3 Sheets-Sheet 3

INVENTOR.
EVERETT W. HOWARD
BY
ATTORNEYS

United States Patent Office 2,903,419
Patented Sept. 8, 1959

2,903,419

HYDROCARBON CONVERSION SYSTEM

Everett W. Howard, Glen Rock, N.J., assignor to The M. W. Kellogg Company, Jersey City, N.J., a corporation of Delaware Application February 10, 1955, Serial No. 487,355

28 Claims. (Cl. 208—164)

This invention relates to an improved method and means for operating a fluid system, and more particularly, it pertains to an improved method and means for reforming light hydrocarbon oils to produce a gasoline product of high anti-knock quality.

This application is a continuation-in-part of application Serial No. 240,993, filed August 9, 1951, now abandoned.

An object of this invention is to provide an improved method and means of operating a fluid system.

Another object of this invention is to provide an improved method and means of reforming a light hydrocarbon oil, particularly a naphtha fraction, for the production of high anti-knock quality gasoline.

Other objects and advantages of this invention will become apparent from the following description and explanation thereof.

In accordance with this invention, the improved method and means are concerned with an operation which comprises contacting a chemical reactant with a dense fluidized mass of finely divided solid material in a reaction zone thus contaminating the solids with volatile and nonvolatile hydrocarbonaceous material, withdrawing contaminated solids from the reaction zone and passing the same upwardly as a lean suspension in a gaseous material in a substantially vertical, elongated, confined zone situated within said reaction zone, passing the contaminated solids from the elongated, confined zone to a stripping zone positioned above said reaction zone and in substantially vertical alignment therewith, stripping volatile material from the solids in the stripping zone, passing the stripped solids to a regeneration zone wherein at least part of the hydrocarbonaceous material is burned and returning the regenerated solids to the reaction zone.

More particularly, the present invention is concerned with a system which comprises contacting a chemical reactant with a dense, fluidized mass of finely divided solid material in a reaction zone at a pressure of at least about 30 p.s.i.g., thus contaminating the solids with volatile and non-volatile hydrocarbonaceous material, withdrawing contaminated solids directly from the lower part of the dense mass in said reaction zone and passing the same upwardly as a lean suspension in a gaseous material at a linear velocity of at least about 10 feet per second in a substantially vertical, elongated, confined zone situated within said reaction zone, passing the contaminated solids from the elongated, confined zone to a stripping zone positioned above said reaction zone and in substantially vertical alignment therewith, stripping volatile material from the solids as a dense fluidized mass in the stripping zone, withdrawing a portion of the stripped solids directly from the dense mass in said stripping zone and passing the same downwardly as a dense, fluidized mass to a regeneration zone, burning at least part of the hydrocarbonaceous material from the solids as a dense, fluidized mass in the regeneration zone, and withdrawing a portion of the regenerated solids directly from the dense mass in the regeneration zone and passing the same as a dense, fluidized mass to the reaction zone.

In another aspect of this invention, the means employed comprises an enlarged contacting means adapted to contain a dense, fluidized mass of finely divided solids, a second contacting means situated above said first contacting means and of smaller cross-sectional area relative thereto and in substantially vertical alignment therewith, a substantially vertical upflow means situated within said first contacting means having its upper end in open communication with the second contacting means and the lower end thereof positioned within the bottom part of said first contacting means, a third contacting means adapted to contain a dense, fluidized mass of finely divided solids, a first transfer means adapted to transfer solids from the second contacting means to the third contacting means and a second transfer means adapted to transfer solids from the third contacting means to the first contacting means.

The present invention is applicable for use in contacting a gaseous material with the finely divided solids under conditions such that a hydrocarbonaceous material is deposited on the solids thus necessitating an initial stripping treatment for the removal of volatile material prior to the regeneration of solids for partial or complete removal of the hydrocarbonaceous material. Accordingly, the present invention can be used for chemical reactions or, for example, hydrocarbon synthesis; the conversion of hydrocarbons, e.g., catalytic cracking; cracking under hydrogen pressure; desulfurization; dehydrogenation; isomerization; gas conversion; etc.

In the hydrocarbon conversion process, a fluid hydrocarbon reactant, in the vaporous or gaseous state, is contacted with a suitable hydrocarbon conversion catalyst at a temperature of about 400° to 1200° F., a pressure of about 1 atmosphere to about 2500 p.s.i.g., a weight space velocity of about 0.01 to 40, and in a moving bed system, a catalyst to oil ratio, on a weight basis, of about 0.001 to about 30.

The present invention is particularly applicable for systems employing an elevated pressure, namely, at least about 30 p.s.i.g. by reason that solids are withdrawn from the reaction zone and transferred upwardly in a gaseous suspension to an elevated stripping zone. Care should be taken in the design of such a system to provide minimum risk from fire or loss of processing materials due to erosion of the conduit or the conveying means in which the gaseous suspension is carried upwardly. The important element of the present invention resides in the use of an up-flow means or riser positioned within the reaction zone, so that in the event of a rupture of the conduit or riser, the processing material will discharge from said riser into the reaction zone without danger of fire or explosion resulting from the intermingling of process materials in the reaction zone. In this respect, the lift gas for the solids withdrawn from the reaction zone is preferably non-reactive with the reactant in the reactor, for example, in hydrocarbon conversion processes the lift gas is a non-oxidizing gas and the reactant is an oxidizable compound or material. The problem is serious when the riser or upflow means is positioned outside the reaction zone, because, in the event that the riser should rupture, loss of material can result with probable fire and explosion. In addition, by placing the riser or upflow means within the reaction zone, it is possible to design the thickness or strength of the riser or upflow means for a lower pressure than if it were positioned outside the reaction zone. In addition, the use of an internal riser or upflow means provides for ease and safety in starting up and shutting down the system. Further, the vertical riser or upflow means provides for easy control of catalyst flow by means of a plug valve means.

In the present invention, the solids are withdrawn from the reaction zone and conveyed upwardly through the elongated, confined zone, which is preferably situated in a vertical position, at a linear velocity of at least about 10 feet per second, and it can be as high as a 100 feet per second, and preferably, a linear velocity of about 15 to 60 feet per second. By reason of the conditions existing within the processing zones, namely, the regenerator, stripper and reactor, the fluid condition of the gaseous suspension of the solids is relatively lean in comparison with the fluidized masses existing within the said processing zones. In this connection, the upflowing suspension of solids in the riser or upflow means has a density of about 1–10, more usually about 2–5, pounds per cubic foot, and it exists as what is usually termed a lean phase. Further, the invention is particularly applicable to systems in which gaseous or vaporous material is contacted with finely divided solids at a pressure of at least about 30 p.s.i.g. and the pressure can be as high as 2500 p.s.i.g., or higher, more usually about 50 to about 1000 p.s.i.g. The tendency for the finely divided solids to erode the riser or conduit in which the suspension of finely divided solids is passed upwardly is particularly pronounced at elevated pressures and, therefore, the present invention is especially adapted for reactions taking place at superatmospheric pressures.

In regard to the various applications of this invention, its outstanding utility lies in the fluid hydroforming process. In the fluid hydroforming process a light hydroforming oil, e.g., naphtha, is contacted with a finely divided hydroforming catalyst under suitable reforming conditions and in the presence of a hydrogen containing gas. As a result of the hydroforming reactions, the catalyst becomes contaminated with volatile and non-volatile hydrocarbonaceous material. In transporting the spent catalyst from the reaction zone to the stripping zone, the spent catalyst is withdrawn from the reaction zone and carried as a suspension in the recycle gas or hydrogen containing gas for passage to the stripping zone. In the stripping zone, the spent catalyst is preferably contacted with steam, although other gaseous stripping agents such as, for example, flue gas, nitrogen, carbon dioxide and recycle gas, can be employed for this purpose. The advantage of using hydrogen-containing gas or recycle gas as the lift gas for the spent catalyst resides in the safety feature of avoiding fire or explosion hazards in the event that the riser or conduit should rupture and result in intermingling of reactants with the lift gas in the riser. Since a hydroforming process is operated under such conditions that there is a net production of hydrogen, a portion of the gas product can be employed for the purpose of lifting the spent catalyst from the reactor to the stripping zone. In fluid hydroforming, the catalyst to oil ratio, on a weight basis, is about 0.01 to 3.0.

In order to provide a better understanding of this invention, reference will be had to the accompanying drawings which form a part of this specification.

For catalytic reforming of hydrocarbon stocks, the catalyst employed includes, for example, a compound of a metal of groups IV, V and VI of the periodic table, preferably in the form of oxides. The metals of the compounds are, for example, chromium, molybdenum, tungsten, titanium, cerium, thorium, etc. These metal compounds, preferably in the form of oxides, are carried or dispersed on various supports or carriers such as, for example, magnesia, alumina, zinc aluminate spinel, activated charcoal, silica or combinations of the foregoing such as, for example, silica-alumina, silica-magnesia, etc. Among these types of catalysts, it is preferred to employ the oxides of the left-hand elements of group VI. A catalyst which is widely used is molybdenum oxide impregnated on "activated alumina" or alumina gel. The catalysts contain about 1 to about 25% of the catalytic element, based on the weight of the total catalyst. Another effective hydroforming catalyst is platinum or palladium supported on alumina. For the purpose hereunder, this catalyst is used in the form of a finely divided powder having particle sizes in the order of about 5 to 150 microns, preferably about 10 to 80 microns. This catalyst forms a fluid bed by maintaining a reactant gas superficial linear velocity in the order of about 0.1 to 6 feet per second therethrough. This gas flow rate is measured as a superficial linear velocity, that is, the velocity of the gas passing through a vessel without any other materials present therein. The preferred superficial linear velocity is in the order of about 1 to 2 feet per second.

The gases in contact with the catalyst are the oil feed and hydrogen. Conveniently, the oil feed rate is expressed as a weight space velocity which is the weight rate of oil feed in pounds per hour per pound of catalyst in the reaction zone. For the hydroforming reaction, the space velocity is generally about 0.1 to 15, preferably about 0.5 to 5. On the other hand, the amount of hydrogen employed in hydroforming is defined as the standard cubic feet of hydrogen (measured at 60° F. and 760 mm. Hg) per barrel of oil feed (the barrel of oil feed is measured as 42 gallons). Generally, hydrogen is employed at the rate of about 1000 to 15,000, preferably about 1000 to 5000, standard cubic feet per barrel of oil feed, abbreviated as "s.c.f.b." The temperature at which the hydroforming reaction is conducted is ordinarily in the order of about 850° F. and may be varied up to about 1075° F. At this temperature, the pressure may be varied in the range of from about 30 to 1000 pounds per square inch gauge, preferably about 50 to 500 p.s.i.g.

Figure 1:
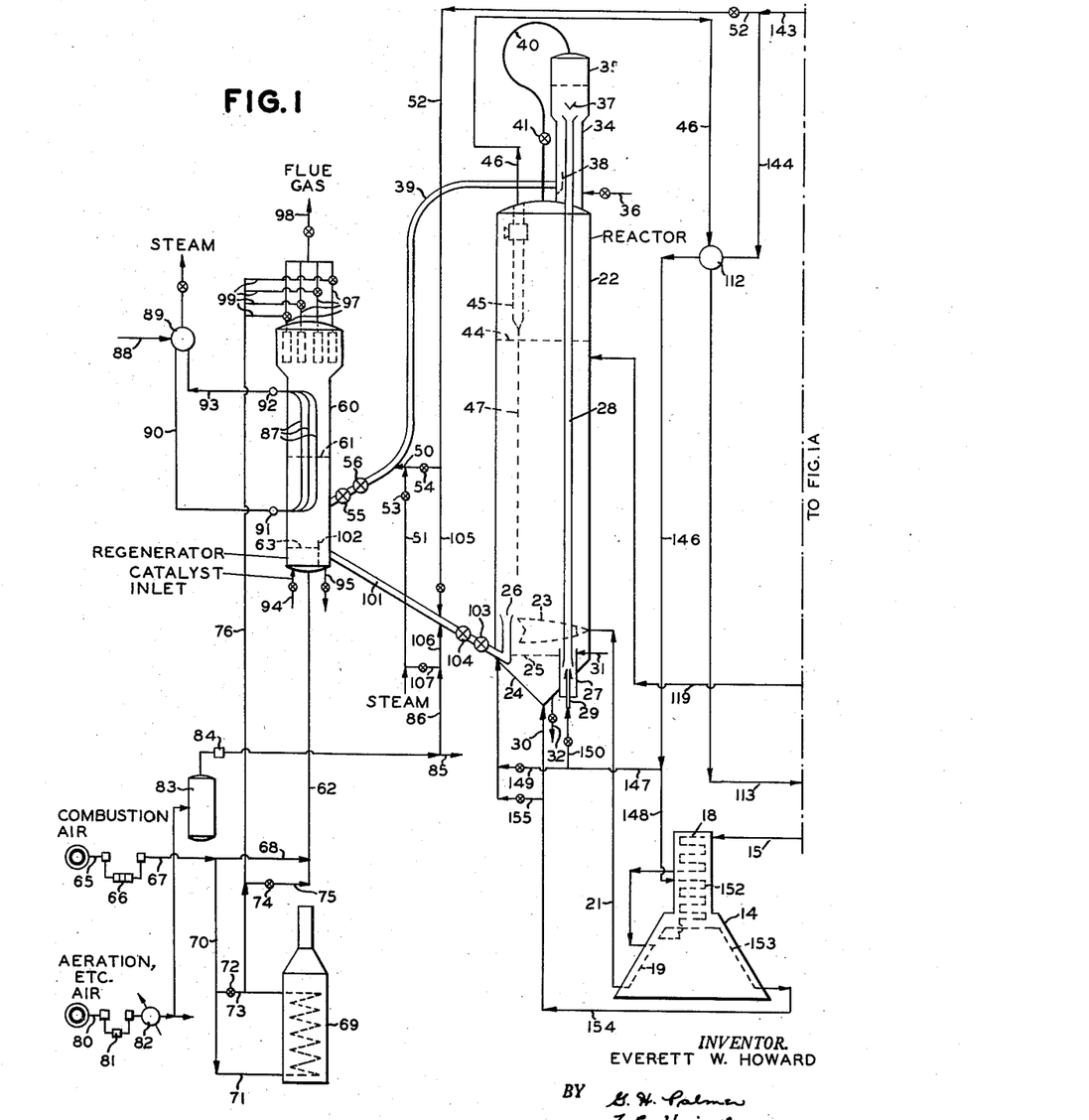
Figures 1 and 1A are a schematic flow diagram of a specific embodiment of this invention.
Figure 1A:
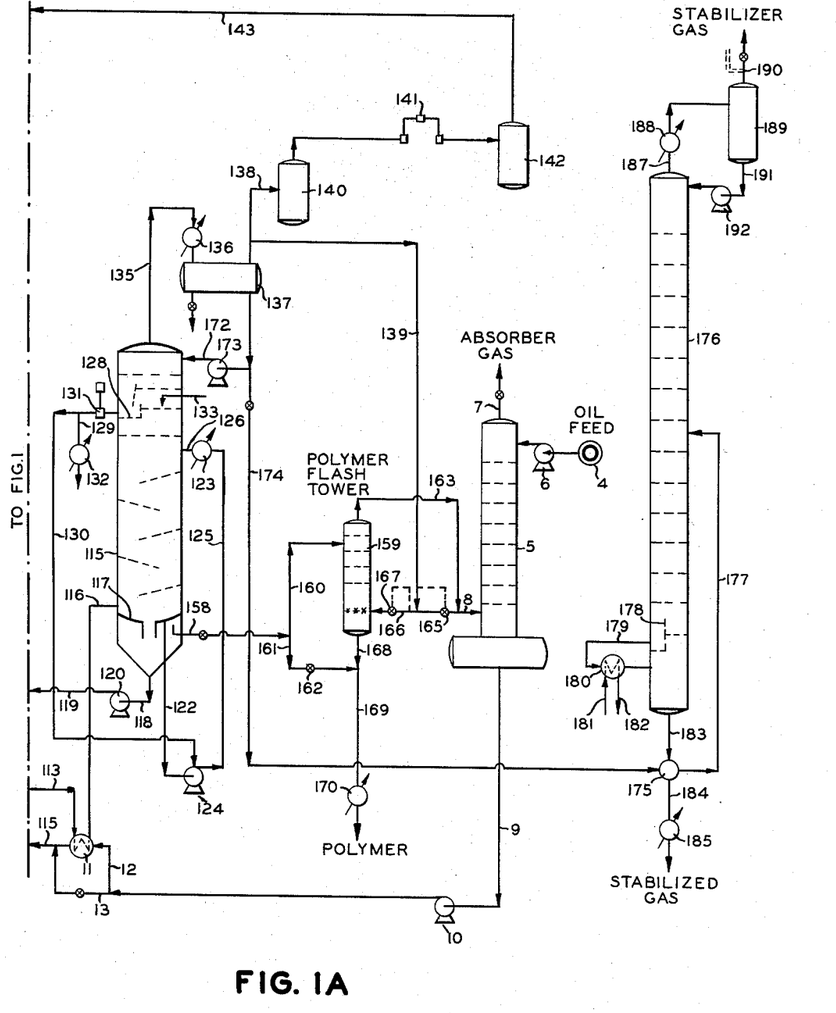

Referring to Figures 1 and 1A, the oil feed such as, for example, naphtha having a specific gravity of 53° API, is introduced through a supply line 4 and transferred into the upper part of an absorption column 5 by means of a feed pump 6. This oil feed is charged at the rate of about 2000 barrels per stream day (22,350 pounds per hour). At the bottom of column 5, a gaseous mixture is introduced through a feed line 8, and in the tower the gas countercurrently contacts the downflowing oil. The gas in this example has a molecular weight of about 14.7 and is fed into the column 5 at the rate of about 3533 pounds per hour. This column may contain packing or bubble plates in order to provide efficient means of contact between the oil and gases which flow countercurrently to each other. In this instance, the absorption tower is a bubble plate column which is operated under a pressure of 85 p.s.i.g. with a bottom temperature of about 120° F. and a top temperature of about 115° F. In this absorption column, any light hydrocarbons in the gas stream, such as those containing at least about 3–4 carbon atoms and heavier, are absorbed into the naphtha. The unabsorbed gases leave the absorption column through a valved line 7; whereas the enriched oil leaves the bottom of the tower through a line 9. The enriched oil feed is then conveyed by means of a pump 10 to either a heat exchanger 11 via line 12, or at least part of the enriched oil may by-pass the heat exchanger by means of a valved line 13. As a result of the heat exchanger 11, this enriched oil will attain a temperature of about 525° F., prior to being charged to a furnace 14 via a line 15. The oil passes through an upper convection coil 18 in the furnace, and is then circulated through a radiant section 19 thereof. After leaving the furnace, the oil has a temperature in the order of about 970°–1050° F.

The hot naphtha vapors leave the furnace 14 through a line 21 and are fed into a reactor 22 by means of a circular distributor header 23. The distributor 23 is located in a horizontal position about 3 feet above the grid plate. This distributor is circular in structure and has openings in the arms for passage of feed into the reactor. Reactor 22 is a vertical cylinder containing a straight side length of about 69 feet and an internal diameter of about 6 feet 3 inches. The bottom of the reactor consists of a hollow conical section 24. Situated within this reactor just above the conical section is a grid plate 25. Along the inside wall of the reactor, above grid plate 25, extends a circular well or regenerated catalyst inlet 26. This well extends above the grid plate to a height of about 6 feet. Spent catalyst is withdrawn from the reactor through another circular well 27 which extends from the outside of the conical section 24 of the reactor to a height of about 1 foot above the grid plate, inside the reactor. The spent catalyst which flows into the well 27 is conveyed upwardly in a circular cross-sectioned spent catalyst riser 28 whose internal diameter is about 2 inches. The catalyst is conveyed upwardly in riser 28 by means of a gas which flows through a vertical hollow conduit 29 which is disposed coaxially with the riser. This conduit 29 may or may not be of the movable type. The rate of solids flowing through the riser 28 may be regulated by adjusting the rate of gas flowing through the conduit 29 and/or by adjusting the distance or clearance between the bottom of riser 28 and the top of the conduit. The catalyst holdup in the reactor can be reduced by withdrawing catalyst through a catalyst line 32 which is connected to the conical section of the reactor.

In the reactor, the finely divided solids employed as catalyst may have a fluid density of about 15 to 80 pounds per cubic foot, or, in the present example, a density of about 30 pounds per cubic foot. Generally, the reaction is conducted with a dense bed of catalyst. To attain this density, the total gas throughput entering at the bottom of the reactor is sufficient to have a superficial linear velocity of about .1 to 6 feet per second, or in the present example, a superficial linear velocity of about 0.84 foot per second. The amount of catalyst which is present in the reactor will provide a bed depth, under the specific conditions enumerated above, of about 54 feet. Under these conditions, the weight space velocity used is about 0.45. By virtue of the temperatures at which the various streams enter the bottom of the reactor, the resultant bed temperature will be about 940° F. Under these conditions, the naphtha feed is converted to a product possessing a higher octane rating. The primary reaction involves dehydrogenation of naphthene compounds in the feed, and to a lesser extent, the aliphatic compounds of at least 6 carbon atoms are cyclized and dehydrogenated to produce aromatic compounds. As a result of these reactions, a carbonaceous material is produced which contaminates the catalyst and causes the activity of the catalyst to decline. The activity is restored by removing the contaminating deposit. In the present example, the catalyst of low activity is conveyed upwardly through the riser 28 at a fluid density in the order of about 1 to 10 pounds per cubic foot, or in this example, about 4 pounds per cubic foot. To attain such densities, the superficial linear velocity of the lifting gas should be about 10 to 100 feet per second, or specifically about 19 feet per second. Generally, the density of the solids flowing upwardly in the riser 28 falls in the lean phase. The lift gas in any kind of process, whether it be a chemical reaction or a hydrocarbon conversion, can be, for example, steam, nitrogen, carbon dioxide, flue gas, etc.

The relative positions of the regenerated catalyst well 26, the oil feed distributor 23, the spent catalyst well 27 and the grid plate 25 are of special interest. The oil feed is introduced at a level above grid plate 25 in order to prevent undesirable thermal cracking of the oil feed at the hot grid plate. Since the hydroforming reaction is endothermic in nature, it is necessary to supply the heat of reaction in order to attain a desired level of conversion. In this respect, in the present invention, a large portion of the heat of reaction is supplied by means of a hydrogen containing gas which is introduced into the reactor by means of line 30 at a point below grid plate 25. By reason thereof, the temperature of the grid plate may run ordinarily higher than the average temperature of the bed in the bottom section of the reactor. Hence, to avoid any undesirable thermal cracking of the oil feed, the point of entry thereof is preferably at a reasonable distance above the grid plate. Another consideration is that the regenerated catalyst, which enters the reactor through well 26, will be at a greater temperature than the temperature of the incoming oil feed. Further, the activity of the regenerated catalyst is higher than the average activity of the catalyst in the reactor. Therefore, in order to avoid any undesirable effects which might occur from the regenerated catalyst, it should be introduced at a level above the point of entry of the oil feed. In this manner, the regenerated catalyst has an opportunity to mix with the catalyst already present in the reactor prior to contacting the incoming fresh oil feed. Under this condition, the incoming oil feed will be catalyzed by a bed of material which is uniform in activity at the desired temperature. Still another consideration is the position of the spent catalyst well 27 through which spent catalyst is withdrawn from the reactor. As would be expected, the fresh oil feed entering the reactor through distributor 23 will flow substantially upward. Therefore, by having well 27 below the point of entry of the oil feed, the tendency of oil vapors to be entrained with spent catalyst and carried out of the reaction zone is reduced. This tendency can be still further reduced by introducing a stripping gas through a line 31 which is connected to the upper part of the well. This gas can be, for example, hydrogen containing gas, steam, flue gas, etc. The rate of gas can be about 0.1 to 15 pounds per 1000 pounds of catalyst flowing upwardly in riser 28.

To obtain the advantages discussed above with respect to the relative positions of the oil feed entrance, the regenerated catalyst entrance, the spent catalyst withdrawal and the grid plate, some variation in positions can be employed. The regenerated catalyst entrance can be about 4 to 10 feet above the grid plate. The oil feed entrance can be from about 2 to 7 feet above the grid plate, and preferably below the level at which regenerated catalyst is introduced into the reactor. The spent catalyst can be withdrawn at a point about 0 to 4 feet above the grid plate, but always below the level at which the oil feed enters the reactor catalyst bed. In one respect, it is advantageous to withdraw the spent or contaminated catalyst as close to the grid plate as is possible. By so doing, the catalyst is subjected to an elevated temperature which is above the average temperature of the catalyst bed, hence, sorbed carbonaceous materials deposited on the catalyst tend to be driven off. Ordinarily, the catalyst should not attain a temperature greater than 1200°–1250° F. for long periods, because permanent impairment to the catalyst might result. In the present invention, this undesirable effect is offset by immediately contacting the spent catalyst with a lift gas or stripping gas having a temperature lower than 1200°–1250° F. Hence, the spent catalyst undergoes some stripping in the reactor between the grid plate and the oil feed entrance, and any undesirably high temperature which might result in this zone is counteracted by the use of a lower temperature lift gas for conveying the spent catalyst upwardly in the riser 28. From the standpoint of stripping, it is desirable to have a maximum catalyst temperature of about 1000° to 1250° F. in the zone between the grid plate and the oil feed entrance.

The introduction of regenerated catalyst into the reactor is made at a position above the grid plate for another reason, and that is, to avoid any attrition which occurs when the catalyst passes through the grid plate. At low velocities of catalyst, the attrition rate may be tolerable, but at high velocities, the attrition rate increases markedly. This factor imposes a limit on the capacity of a particular operation, because catalyst replacement rates become economically unattractive at high catalyst flow rates.

The spent catalyst which flows upwardly through the riser 28 enters a stripper which is a vertical cylindrical vessel superimposed on reactor 22, but offset from the center line thereof. The material in riser 28 is flowing preferably in a vertical position, however, it should be understood that the line of travel can be offset from the true vertical by about 15° and still come within the terms of this invention, and more than one riser can be used for the purpose. This stripper contains a lower section 34 which is about 11 feet long and has an internal diameter of about 12 inches. This lower section is joined by an upper enlarged section 35 which has a length of about 14 feet and an internal diameter of about 21 inches. The riser 28 extends through the lower section 34 of the stripper in a vertical position and terminates at the beginning of upper section 35. At the bottom of stripper section 34, a stripping gas, such as, for example, steam, is introduced at the rate of about 300 pounds per hour through line 36. This stripping gas is used for a catalyst-oil ratio of about 0.35; however, the stripping gas rate can vary from about 100 to 1000 pounds per hour for the catalyst rate used in this example. In order to avoid excessive turbulence which may be caused by the introduction of spent catalyst into the stripper, a baffle 37 is superposed above the discharge opening of riser 28.

The stripped solids leave the stripper through a segmental well 38 which is located in the bottom part of lower section 34, and thence, through a spent catalyst transfer line or standpipe 39, the upper end of which is connected to the well. The gases in the stripping zone leave the stripper through an overhead line 40 and are returned to the top of the reactor. In this example, the pressure in the top of the reactor is maintained at about 250 p.s.i.g. By means of a control valve 41 which is installed in line 40, it is possible to regulate the pressure in the stripper at a value above the pressure existing in the reactor. If valve 41 is kept wide open so that there is little or no back-pressuring effect therefrom, the pressure in the upper part of the stripper will be for this example, in the order of about 250.1 p.s.i.g. However, this pressure can be maintained in the range of about 250.1 to 255 p.s.i.g. By increasing the pressure in the stripper, the overall height of the reactor and stripper can be reduced as much as 5 to 15 feet. Therefore, by controlling a higher than normally expected pressure in the stripper, it is possible to reduce construction costs.

In the upper part of the reactor, gases are disengaged from the solids shown as bed level 44, and thence, flow into a cyclone separator 45, wherein a further separation of gases from solids is effected. The separated gases leave the top of the reactor through a product line 46. The processing of this product gas stream will be discussed in more detail hereinafter. The separated solids in the cyclone 45 are returned to the reactor bed through a long drainpipe or dipleg 47. This dipleg is about 40 feet in length and discharges the separated catalyst into the reactor bed at a point about 10 feet above the grid plate. By having the dipleg extend into the reactor bed to this extent, it is possible to substantially overcome any tendency of the catalyst to classify, i.e., the solids of small particle size will concentrate in the upper region of the reactor bed and the solids of larger particle size will accumulate in the lower part of the reactor bed. Another advantage is that at least a portion of the fine catalyst material will be circulated throughout the reactor bed. Furthermore, a long dipleg has the practical advantage of insuring flexibility of operation. Hence, the extended dipleg will permit operating with a low reactor catalyst bed level and tends to avoid excessive carryover to the product recovery system which occurs when the dipleg is unsealed.

The combination of upflowing fluidized solids in the riser 28, separation or disengagement of solids in the stripping zone, and further contacting of such solids with a stripping gas in the stripping zone, represents a unique flow arrangement whereby maximum stripping efficiency may be accomplished. Spent catalyst will contain volatile and nonvolatile carbonaceous material. In order to reduce the regeneration requirements of the system, it is desirable to remove as much of the volatile contaminants as is possible. This is accomplished by contacting the solids with a stripping gas, such as, for example, steam, nitrogen, carbon dioxide, hydrogen containing gas, flue gas, etc. Ordinarily, the volatile components of carbonaceous material are occluded and/or sorbed by the solids. The sorption of volatile components is in the nature of absorption and/or adsorption. Hence, by contacting the spent catalyst with a gas in riser 28 in a concurrent fashion, an initial stripping of volatile material is effected by dilution and some desorption. The disengagement of the solids from the upflowing gases in the stripping zone effects additional stripping. The last stage of stripping is accomplished by countercurrently contacting the downflowing solids in the stripper with a stripping gas, such as, for example, steam, etc. Therefore, by means of the present invention, maximum stripping efficiency can be realized through concurrent contacting of spent catalyst with a gas, disengagement or separation of the solids from said gas, and then countercurrently contacting said separated solids with a stripping gas. In practice, ordinarily, such stripping is accomplished by concurrent lean phase stripping, followed by disengagement or separation of the solids from the gaseous materials, and then countercurrent dense phase stripping.

The stripped solids leave the stripper vessel through the standpipe 39. These stripped solids are in a dense fluidized state in the standpipe and have a density of about 15 to 50 pounds per cubic foot. In this example, the stripped catalyst will be withdrawn from the stripper at the rate of about 7910 pounds per hour and will have a density of about 36 pounds per cubic foot in the standpipe 39. This standpipe has a 2½ inch diameter, and the solids flow therein at the rate of about 2.1 feet per second. This catalyst is maintained in an aerated condition by introducing an aerating gas, such as, for example, steam, into the standpipe. Steam is fed into the standpipe 39 through aeration lines 50 and 51. The rate of gas through these lines is about 3 pounds per hour of 400 p.s.i.g. steam. The alternative method of aerating the catalyst would be by means of a hydrogen containing gas or a recycle gas which is fed through an aeration line 52. More usually, aeration is effected by means of steam which is fed through line 51, hence, valve 53 is maintained open and valve 54 is kept closed. The rate of catalyst flowing through standpipe 39 is automatically controlled by means of a slide valve 55. For safety and control reasons an auxiliary valve 56 is installed in the standpipe in an adjacent position to the slide valve. By reason of the height of fluidized catalyst in standpipe 39, the total pressure just above valve 56 is increased to 267.9 p.s.i.g. The total pressure drop across valve 55 is about 5.4 p.s.i.

The spent catalyst leaves standpipe 39 and enters a regenerator vessel 60. This regenerator is a vertical cylindrical vessel having an effective internal diameter of about 2 feet three inches. This diameter takes into account any insulating material which lines the inside walls of the vessel. The overall length of the regenerator is 23 feet. Inside the regenerator, a catalyst bed in dense phase having a level 61 is present. This catalyst bed can have a density of about 15 to 80 pounds per cubic foot. In this example, the density is about 36 pounds per cubic foot. The catalyst is regenerated in this vessel by burning any contaminating deposits with an oxygen containing gas which is introduced through a line 62 which is connected to the bottom of the regenerator. The oxygen-containing gas, e.g., air, enters the regenerator at a point below a grid plate 63 which serves to uniformly distribute the air over the cross-sectional area of the bottom of the vessel. This air is supplied through a supply line 65 at the rate of about 3807 pounds per hour and is compressed be means of a compressor 66 to a pressure of 275 p.s.i.g. and a temperature of about 290° F. In this condition, the air may be introduced directly into the regenerator through lines 67, 68 and 62, or part of the air may be passed through a furnace 69 by means of lines 70 and 71, before being fed into the regenerator. In this example, the compressed air is passed directly into the regenerator without preheat by means of furnace 69. A portion of this compressed air stream, such as, for example, 540 pounds per hour, is heated to a temperature of 1100° F. by means of furnace 69 and is used as a blow-back for the filters shown in the top of the regenerator. Under normal operating conditions, valve 72 which is installed in the by-pass line 73 is kept closed; as well as valve 74 in line 75 which serves to introduce heated air into the regenerator. The heated air employed for blow-back of the filters in the regenerator is fed through line 76.

The air which is used for aeration and instrument control is supplied through line 80. The air is compressed by means of a compressor 81, and thence cooled in a cooler 82. The cooled air passes into drum 83 wherein any liquid condensate is trapped. At this point, the air is under a pressure of 300 p.s.i.g. and a temperature of 100° F. The cooled air is then passed into a dryer 84 and thereafter is employed in instruments and for purposes of aeration. That portion of air which is used for the operation of instruments is supplied through a line 85; whereas the portion used for aeration is supplied through a line 86.

By contacting the air with spent catalyst in the regenerator, the temperature of the solids increases from the combustion of contaminated material. In the case of using 9% by weight of molybdenum oxide supported on alumina, the temperature of regeneration is maintained at about 1100° F. However, this temperature can be varied from about 850° to 1200° F. The temperature is maintained at this level by means of a plurality of vertical tubes 87 which is directly in contact with the catalyst bed in the regenerator. The heat of combustion is removed by heating water which is supplied from a line 88 into a boiler drum 89. The water flows from the boiler drum through a line 90 into a common header 91 which is located outside the regenerator and serves to distribute same through the vertical tubes which are disposed in the catalyst bed. The desired removal of heat is accomplished by heating and vaporizing the water. The heated water and steam which is formed in tubes 87 flow from the vertical tubes into a second common header 92 located outside the regenerator and then through a line 93 into drum 89, wherein the steam is separated and removed through an overhead valved line. The heated water is recycled through line 90, along with fresh water which is fed through supply line 88. The presence of a bed cooler in regenerator 60 can also serve as a means of controlling the temperature of regeneration by varying the height of catalyst bed in this zone. For this purpose, the banks of vertical tubes disposed within the regenerator should be of sufficient length, so that by varying the height of the catalyst bed in the regenerator, additional cooling surface is furnished, thus the temperature can be maintained within the desired operating range. The height of the catalyst bed in the regenerator can be varied by introducing additional catalyst through line 94 and by removing catalyst through line 95, both of which are connected to the bottom of the regenerator. Line 95 also serves to withdraw aged or low activity catalyst from the regenerator; whereas line 94 is also used to add fresh or high activity catalyst. Another method of varying the height of the catalyst bed in the regenerator is by varying the rate of air which is introduced through line 62. This technique will cause the density of the catalyst in the regenerator to change, and accordingly, the height of the bed will rise or fall depending upon the change in density which is effected. Ordinarily, the rate of combustion air which is fed to the regenerator is regulated to produce superficial linear gas velocities in the order of about 0.1 to 3 feet per second. Depending upon the cooling results desired, these gas velocities may or may not be sufficient alone to produce the desired cooling. If changing the air rate is not adequate for producing the required cooling, it may be necessary to regulate the quantity of catalyst which is present in the regenerator, by withdrawing or adding same, as the case may be.

The flue gases leaving the catalyst bed in the regenerator usually contain entrained solids which are separated from the gaseous stream by means of filters 96, which are located in the upper enlarged section of the regenerator. The separated gases leave the system through lines 97 which are connected to the filters 96, and thence flow through a valved exit line 98. However, after certain periods of operation, these filters become coated with solid material on the outer surface. In order to improve the efficiency of operation and avoid an excessive pressure drop across the filters, these filters are blown back with a gas, such as, for example, air, through lines 99 which are connected to line 97. The blow-back gas is supplied to lines 99 by means of line 76. As previously indicated, the air used for this purpose is heated to a temperature of about 1100° F.

The air is heated to this temperature in order to avoid any thermal shock effects. By appropriate arrangement, these filters are blown back with a gas in a suitable manner without interrupting the operation of the unit. The regenerated catalyst leaves the bottom of the regenerator through a line or standpipe 101. This standpipe 101 is connected to the bottom of the regenerator where a segmental well is formed by a vertical transverse baffle 102. This standpipe is, for example, a pipe of 2½ inch diameter and contains a slide valve 103 for automatically controlling the flow of solids and an auxiliary valve 104 for safety and control purposes. The catalyst in this standpipe is in a dense fluidized condition and it can have a density of about 15 to 50 pounds per cubic foot, or, in this example, about 36 pounds per cubic foot. This catalyst can be aerated with recycle gas through an aeration line 105 and/or through a line 106 which is derived from the air supply line 86. The steam supply can also flow through a valve line 107 and be used to aerate regenerated catalyst in the standpipe 101 which is flowing to the reactor.

The reaction products which leave the reactor 22 are first passed through a heat exchanger 112 whereby products are cooled from 920° F. to 700° F. The cooled product is then passed via line 113 into a second heat exchanger 11 wherein the temperature is reduced from 700° F. to 530° F. After leaving the second heat exchanger 11, the products are fed into the bottom part of a fractionating tower 115 through a line 116. The cooled products are fed into the fractionating tower 115 at a point above the bottom head 117. At a temperature of 420° F. and a pressure of 240 p.s.i.g. in this tower, a liquid product is produced from the bottom of the tower through a line 118 having a specific gravity of 31° API. This liquid is produced at the rate of 3120 pounds per hour and contains about 430 pounds of catalyst fines which are carried over in the reaction product from the reactor. This bottom product is recycled to the reactor 22 by means of line 119 by means of a pump 120. The slurry liquid in the base of the fractionator above the bottom head 117 is withdrawn through a line 122 and passed through a cooler 123 by means of pump 124 and line 125. The liquid thus cooled is recycled to the middle section of the tower through a line 126. From a tray 128 in the upper part of the tower, a high pressure gland oil and flushing oil having a specific gravity of about 33° API is withdrawn at the rate of about 3750 pounds per hour, and is passed through lines 129 and 130 by means of pump 131. The gland oil stream flowing through line 129 is cooled by means of cooler 132 and is withdrawn from the system. This stream is returned to the tower in line 133. In line 130, the flushing oil being at a temperature of about 320° F. is circulated to the glands of pump 124, and thence joins the stream of liquid flowing through line 125. This flushing oil serves to keep any solid materials from the bearing surfaces in the pump.

An overhead product leaves tower 115 through line 135 and it is first cooled in a cooler 136 and then passed into an accumulator 137. In this accumulator, the gaseous materials are separated from the liquid and are removed through overhead lines 138 and 139. The gases leaving through line 138 pass into a trap drum 140 wherein any liquid condensate is separated from the gaseous material prior to passing the stream to compressor 141. The gas is compressed and then passed into a second trap drum 142 before being recycled for re-use by means of a line 143. This gaseous material having a molecular weight of 14 contains an appreciable amount of hydrogen and it serves as a recycle gas to the reactor. The recycle gas is recycled to the reactor at the rate of 18,467 pounds per hour. The temperature of the recycle gas in line 143 is about 140° F. This gas stream is divided so that a portion flows through line 52, which was discussed hereinabove, and the remaining portion passes through another line 144. The gas in line 144 is first heated to a temperature of about 700° F. by means of an exchanger 112. After leaving exchanger 112, the recycle gas stream 146 divides by passing through lines 147 and 148. That portion of recycle gas which passes through line 147, may serve to aerate the regenerated catalyst which enters the reactor through well 26. This gas enters well 26 through line 149. The other portion of this low temperature recycle gas stream is introduced into conduit 29 through line 150 and serves to lift any spent catalyst in well 27 through riser 28. The use of recycle gas as a carrying means for transporting spent catalyst from the reactor to the stripper represents a distinct economic advantage in my process. Furthermore, in this example, this gas exists at a low temperature, e.g., in the order of about 700°, and therefore serves to cool the spent catalyst prior to entering the regenerator. The cooling of catalyst at this point is important when the spent catalyst leaves the reactor at a temperature of about 1100°–1200° F., in order to reduce the length of time that the catalyst exists at such a temperature. This recycled gas stream which is employed as a carrying means may have a temperature varying from about 200° to 900° F., preferably about 500° to 700° F. For carrying purposes, in this example, about 370 pounds per hour of recycle gas can carry from about 1000 to 10,000 pounds per pound of catalyst.

The portion of recycled gas which flows through line 148 is fed into a convection coil 152 of furnace 14. Thereafter, the recycle gas is passed through a radiant section 153 of this furnace. The recycle gas leaves the furnace through a line 154 having a temperature of about 1240° to 1310° F. This hot recycle gas is passed to the bottom of the reactor through a line 30 and serves to supply the necessary heat of reaction. The temperature of this recycle gas can vary from about 1000° to 1400° F. In this example, about 18,097 pounds per hour of recycle gas are employed; however, generally, this rate can vary from about 10,000 to 30,000 pounds per hour. It is advantageous to furnish the heat of reaction by means of the recycle gas rather than the oil feed, because the loss of valuable products through thermal cracking is reduced. A portion of the hot recycle gas passing through line 154 flows through a valved line 155 and serves as an aerating and catalyst reduction means for the regenerated catalyst which is entering the reactor through line 26. Catalyst reduction is important, because in the case of hydroforming catalyst such as, for example, molybdenum oxide, either alone or supported on a carrier, the catalyst tends to become deactivated under regeneration conditions. Such an occurrence is counteracted by contacting the regenerated catalyst with pure hydrogen or a hydrogen containing gas at a temperature of 700° to 1400° F.

Just below the bottom head 117 of tower 115, decanted oil is withdrawn through a valved line 158 and may enter the top part of polymer flash tower 159 through line 160. This flash tower serves to remove any gasoline component from the polymer. The flash tower may be by-passed by means of a line 161 which contains a valve 162. The liquid withdrawn from the bottom of tower 115 has a specific gravity of about 31° API and it is fed into the flash tower at a rate of about 958 pounds per hour. This liquid is present in tower 115 at a temperature of 420° F. and at a pressure of 240 p.s.i.g. In the flash tower, the pressure is maintained at about 85 p.s.i.g., hence, causing any low boiling components to flash overhead and leave the tower through an overhead line 163. This overhead product has an average molecular weight of about 48.5 and is produced at the rate of about 243 pounds per hour. The overhead product is passed into line 8, wherein gaseous materials leaving accumulator 137 are also introduced through line 139. The rate of flow of gaseous material entering line 8 from line 139 is regulated by means of a control valve 165. A portion of the gas stream which enters line 8 from line 139 is recycled to the flash tower through a line 166. This gas is used as a stripping means for the removal of gasoline from the polymer material. The rate of stripping gas is controlled by means of control valve 167 which is installed in line 166. The gaseous material is recycled to the flash tower through line 166 at the rate of about 50 pounds per hour and it has an average molecular weight of 14. A heavy polymer material is separated as a bottom product from the flash tower. This product has a specific gravity of about 30° API and is produced at the rate of about 165 pounds per hour. The polymer leaves the flash tower through a line 168 at a temperature of about 365° F. This polymer is passed through a line 169 and thence through a cooler 170 wherein the temperature is reduced to about 125° F.

The liquid product which is produced as an overhead stream of tower 115 is passed to accumulator vessel 137; after which a portion of the liquid product is recycled to the top of tower 115 through a reflux line 172 by means of reflux pump 173. This liquid product contains a specific gravity of about 51.7° API and is recycled to tower 115 at a rate of about 23,100 pounds per hour. The remainder of the liquid product which is produced as the overhead stream of tower 115 is passed through a valved line 174 at the rate of about 19,472 pounds per hour. This liquid is the unstabilized gasoline product. The liquid product is at a temperature of about 105° F. As a result of a heat exchanger 175, the liquid product is raised in temperature to about 310° F. Thereafter, it is fed into the middle section of a 30 plate stabilizer tower 176 by means of feed line 177. The stabilizer is operated at a pressure of about 140 p.s.i.g. with a bottom temperature of about 385° F. and a top temperature of about 155° F. The temperature at the bottom of the tower is maintained by withdrawing a portion of the liquid from the drawoff tray 178 which is located in the bottom part of the tower through a line 179 and passing the same through a heater 180 whereby the temperature is raised from about 355° F. to about 385° F. Heat is supplied to the heater 180 by 400 p.s.i. steam which is fed through a line 181 and the condensate is discharged from the heater through line 182. A stabilized gasoline is produced from the bottom of the tower through bottom line 183 and is passed through the heat exchanger 175 whereby the temperature is reduced to about 130° F. The stabilized gasoline product leaves the heat exchanger 175 through line 184 and enters a cooler 185 whereby the temperature is further reduced to about 120° F. This stabilized gasoline product is produced at the rate of about 17,661 pounds per hour and contains a specific gravity of about 43.1° API. The overhead product from the stabilizer leaves through an overhead line 187 and is then cooled and condensed by means of a condenser 188 to a temperature of about 120° F. This overhead product is then passed to a separator 189 wherein a stabilizer gas having a molecular weight of about 45.1 is released through an exit valved line 190 at the rate of about 1811 pounds per hour. The liquid in the separator is returned to the top of the stabilizer by means of a reflux line 191 and reflux pump 192. The liquid is refluxed at the rate of about 13,080 pounds per hour.

Figure 2:
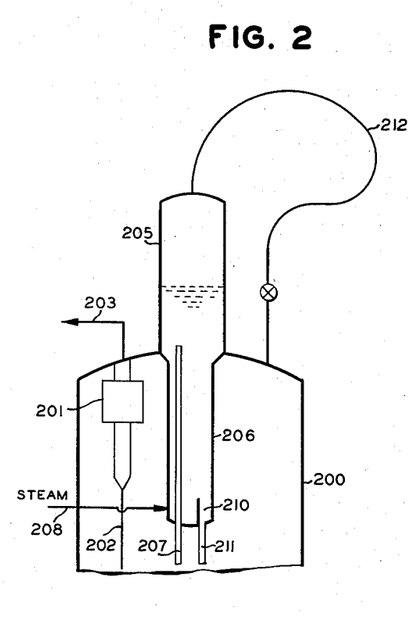
Figure 2 illustrates a combination of a stripping zone and a reaction zone.

In Figure 2, another specific example of a combination of stripper and reactor is shown. In this figure, only the top of the reactor in combination with the stripper is illustrated, because the remainder of the apparatus can be the same as illustrated in Figure 1. In the drawing, the reactor 200 contains cyclone separator 201 having a dipleg 202 and a reaction product line 203. The stripper vessel is located on the reactor, an enlarged section 205 is disposed outside the reactor and a lower reduced section 206 is concentrically disposed within the reactor vessel. The spent catalyst is introduced into the stripper by means of a vertical riser 207 which extends from the reactor through the lower section 206 and ends at the bottom of the upper section 205. The catalyst in the stripper is contacted with a stripping gas, such as, for example, steam, which is introduced through a stripping gas inlet line 208 at the bottom of stripper section 206. Catalyst is withdrawn from the stripper through a segmental well 210 which is situated within the bottom of stripper section 206, and travels downwardly through a standpipe 211. It is to be noted that a substantial part of the standpipe in this illustration will be contained with the reactor except for a portion thereof which leads from the reactor to the regenerator at about the position at which the regenerator is located. Gases leave the top of the stripper through a valved overhead line 212 which is connected to the top of the reactor.

Figure 2 is an example of an apparatus design whereby the overall height of the combination of reactor and stripper can be reduced. As is apparent from the drawing, a portion of the stripper is situated within the reactor vessel, hence the overall height of these processing vessels can be decreased, approximately, by the length of stripper which is situated within the reactor. Furthermore, this type of a design decreases the length of standpipe which is required for transferring the catalyst from the stripper to the regenerator. In this respect, however, a portion of the standpipe will be located within the reactor.

Figure 3:
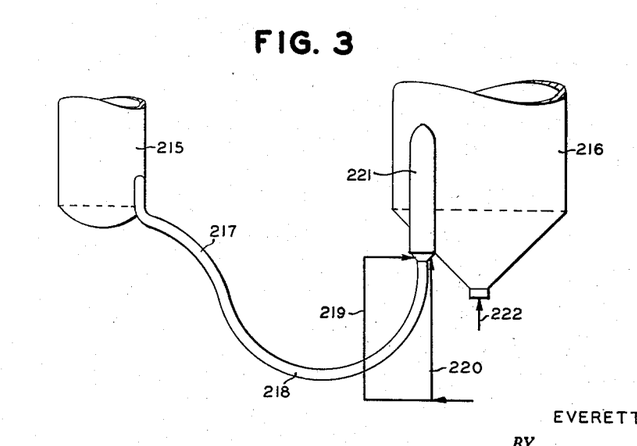
Figure 3 is an example of an apparatus for transferring solids from a regeneration zone to a reaction zone.

Figure 3 is a modification of the apparatus shown in Figure 1 for transferring the regenerated catalyst from the regenerator to the reactor. In Figure 1, the standpipe employed for this purpose is shown as being a substantially straight conduit flowing directly from the regenerator to the reactor. This standpipe will be subjected to an expansion strain due to the high temperature of the materials flowing therein, which will cause the processing vessels to be pushed farther apart. This effect can be substantially overcome by means of the apparatus illustrated in Figure 3. In this figure, a portion of regenerator 215 and a portion of reactor 216 are illustrated with respect to standpipe 217. The standpipe contains a U-bend 218 which will accommodate any expansion due to high temperatures. In the event of expansion, the standpipe will tend to deform in a downward direction with respect to the positions of the processing vessels. In this manner, there is substantially less of a tendency for the processing vessels to be pushed apart by reason of expansion in the standpipe. The catalyst flowing in this standpipe can be aerated by means of steam, recycle gas, etc. which is introduced through lines 219 and 220 at a point where the transfer line is about to enter the reactor. The regenerated catalyst enters the reaction zone through a circular well 221. The recycled gas is introduced into the reactor at the bottom of the conical section through a gas line 222. It should be understood that a U-bend can also be used in the transfer line from the stripper to the regenerator. Other features of apparatus will be substantially the same as illustrated in Figure 1.

Figure 4:
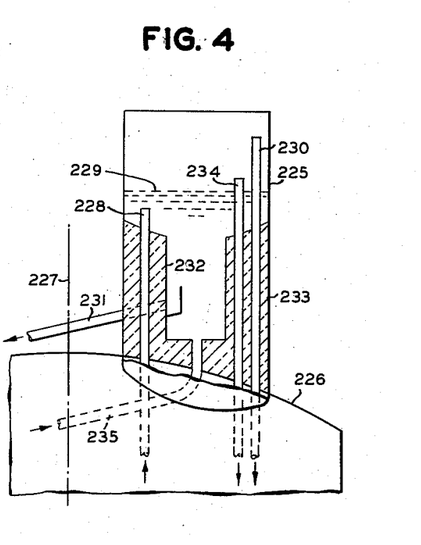
Figure 4 is another example of an apparatus for stripping contaminated catalytic solids.

Figure 4 is an example of another stripper design which can be used for the purpose of this invention. In this figure, the stripper shell 225 is a vertical, cylindrical vessel superimposed on the top of the reactor 226. The stripper is offset from the center line 227 of the reactor. The stripper is sealed from the reactor except for processing lines which serve to exchange materials between two zones. In this respect, spent catalyst is introduced into the stripper from the reactor through a vertical riser 228 which extends upwardly to about the middle section of the stripper. The materials flowing from the riser constitute spent catalyst and carrying gas. The solids become disengaged from the gaseous materials due to the reduction of linear velocity and settle downwardly to form a dense bed having a level 229. The gaseous materials leaving the stripping zone through a vertical conduit 230 which extends from the top of the stripper and terminates within the top of the reactor. The catalyst level in the stripper is maintained by a constant withdrawal through a transfer line 231. This transfer line is connected to the bottom of a stripping well 232 into which catalyst flows after being discharged from the riser 228. This stripping well is concentrically disposed within the stripper shell 225, and extends from about the middle portion of the stripper shell to a point just above the top of reactor 226. The annular space between shell 225 and stripping well 232 and between the stripping well and the top of reactor 226 are sealed with an insulating material 233. Fluctuations in bed level 229 beyond the desired height are regulated by recirculating catalyst from the top of the bed in the stripper to the reactor by means of a vertical overflow conduit 234 which extends from the upper part of shell 225 to the inside of reactor 226. The catalyst in the stripper is contacted with a stripping gas such as, for example, steam, by means of a line 235 which is connected to the bottom of the stripping well.

This design has the advantage of an internal vapor line for passing gases from the stripping zone to the reaction zone. Furthermore, any overflow of catalyst above the desired height is automatically removed by means of the overflow conduit which is disposed within the stripper. This modification of apparatus also provides a compact system having few external lines for the transfer of materials between the stripper and other processing vessels. This design eliminates any possible erosion of the vertical conduits by the stripping steam in the presence of catalyst in the well 232. No erosion would be expected in the wall of the well 232.

Having thus described my invention by furnishing a specific example thereof, it should be understood that no undue limitations or restrictions should be imposed by reason thereof, but that the scope of my invention is defined by the appended claims.

I claim:

1. A process which comprises contacting a chemical reactant with a dense fluidized mass of finely divided solid material in a reaction zone thus contaminating the solids with volatile and non-volatile hydrocarbonaceous material, withdrawing contaminated solids from the lower portion of the reaction zone and passing the same upwardly as a lean suspension in a gaseous material in a substantially vertical elongated confined zone within said reaction zone at a point below the entry of the chemical reactant thereto, passing the contaminated solids from the elongated confined zone to a stripping zone positioned above said reaction zone, stripping volatile material from the solids in the stripping zone, passing the stripped solids to a regeneration zone wherein at least part of the hydrocarbonaceous material is burned with an oxygen containing gas and returning the regenerated solids to the reaction zone.

2. A process which comprises contacting a chemical reactant with a dense fluidized mass of finely divided solid material in a reaction zone at a pressure of at least about 30 p.s.i.g., thus contaminating the solids with volatile and non-volatile hydrocarbonaceous material, withdrawing contaminated solids directly from the lower portion of the dense mass in said reaction zone and passing the same upwardly as a lean suspension in gaseous material at a linear velocity of at least about 10 feet per second in a substantially vertical elongated confined zone within said reaction zone at a point below the entry of the chemical reactant thereto, passing the contaminated solids from the elongated confined zone to a stripping zone positioned above said reaction zone, stripping volatile material from the solids as a dense fluidized mass in the stripping zone, withdrawing a portion of the stripped solids directly from the dense mass in said stripping zone and passing the same downwardly as a dense fluidized mass to a regeneration zone, burning with an oxygen containing gas at least part of the hydrocarbonaceous material from the solids as a dense fluidized mass in the regeneration zone, and withdrawing a portion of the regenerated solids directly from the dense mass in the regeneration zone and passing the same as a dense fluidized mass to the reaction zone.

3. An apparatus comprising in combination an enlarged contacting means adapted to contain a dense fluidized mass of finely divided solids, a second contacting means situated above said first contacting means and of smaller cross-sectional area relative thereto, a substantially vertical upflow means situated within said first contacting means having its upper end in open communication with the second contacting means and the lower end thereof positioned within the lower portion of said first contacting means, a third contacting means adapted to contain a dense fluidized mass of finely divided solids, a first transfer means adapted to transfer solids from the second contacting means to the third contacting means, a second transfer means adapted to transfer solids from the third contacting means to the first contacting means, and gaseous inlet means for the introduction of gaseous material to said first, second and third contacting means.

4. A process which comprises contacting an oxidizable chemical reactant with a dense fluidized mass of finely divided solid material in a reaction zone thus contaminating the solids with volatile and non-volatile hydrocarbonaceous material, withdrawing contaminated solids from the lower portion of the reaction zone and passing the same upwardly as a lean suspension in a non-oxidizing gaseous material in a substantially vertical elongated confined zone within said reaction zone at a point below the entry of the chemical reactant thereto, passing the contaminated solids from the elongated confined zone to a stripping zone positioned above said reaction zone, stripping volatile material from the solids in the stripping zone, passing the stripped solids to a regeneration zone wherein at least part of the hydrocarbonaceous material is burned with an oxygen containing gas and returning the regenerated solids to the regeneration zone.

5. An apparatus comprising in combination a first enlarged contacting means adapted to contain a dense fluidized mass of finely divided solids, a second contacting means situated above said first contacting means and of smaller cross-sectional area relative thereto and in substantially vertical alignment therewith, a substantially vertical upflow means within said first contacting means having its upper end in open communication with the second contacting means and the lower end thereof positioned within the lower portion of said first contacting means, a third contacting means adapted to contain a dense fluidized mass of finely divided solids, a first transfer means adapted to transfer solids from the second contacting means to the third contacting means, a second U-bend transfer means adapted to transfer solids from the third contacting means to the first contacting means, and gaseous inlet means for introducing gaseous material to said first, second and third contacting means.

6. The apparatus of claim 5 wherein the first transfer means is a U-bend transfer means adapted to transfer solids from the second contacting means to the third contacting means.

7. A hydrocarbon conversion process which comprises contacting a hydrocarbon reactant with a dense fluidized mass of finely divided solid catalytic material in a reaction zone thus contaminating the catalyst with volatile and non-volatile hydrocarbons, withdrawing contaminated catalyst from the lower portion of the reaction zone and passing the same upwardly as a lean suspension in a gaseous material in a substantially vertical elongated confined zone within said reaction zone at a point below the entry of the hydrocarbon reactant thereto, passing the contaminated catalyst from the elongated confined zone to a stripping zone positioned above said reaction zone, stripping volatile material from the catalyst in the stripping zone, passing the stripped catalyst to a regeneration zone where at least part of the hydrocarbonaceous material is burned with an oxygen containing gas and returning regenerated catalyst to the reaction zone.

8. A hydrocarbon conversion process which comprises contacting a hydrocarbon reactant with a dense fluidized mass of finely divided solid catalytic material in a reaction zone at a pressure of at least about 30 p.s.i.g., thus contaminating the catalyst with volatile and non-volatile hydrocarbonaceous material, withdrawing contaminated catalyst directly from the lower portion of the dense mass in said reaction zone and passing the same upwardly as a lean suspension in a gaseous material at a linear velocity of at least about 10 feet per second in a substantially vertical elongated confined zone within said reaction zone at a point below the entry of the hydrocarbon reactant thereto, passing the contaminated catalyst from the elongated confined zone to a stripping zone positioned above said reaction zone, stripping volatile material from the catalyst as a dense fluidized mass in the stripping zone, withdrawing stripped catalyst directly from the dense mass in the stripping zone and passing the same downwardly as a dense fluidized mass to a regeneration zone, burning with an oxygen containing gas at least part of the hydrocarbonaceous material from the catalyst as a dense fluidized mass in the regeneration zone, and withdrawing a portion of the regenerated catalyst directly from the dense mass in the regeneration zone and passing the same as a dense fluidized mass to the reaction zone.

9. A hydroforming process which comprises contacting a light hydrocarbon oil with a dense fluidized mass of finely divided solid reforming catalyst in a reaction zone thus contaminating the catalyst with volatile and non-volatile hydrocarbonaceous material, withdrawing contaminated catalyst from the lower portion of the reaction zone and passing the same upwardly as a lean suspension in a gaseous material in a substantially vertical elongated confined zone within said reaction zone at a point below the entry of the hydrocarbon oil thereto, passing the contaminated catalyst from the elongated confined zone to a stripping zone positioned above said reaction zone, stripping volatile material from the catalyst in the stripping zone, passing the stripped catalyst to a regeneration zone wherein at least part of the hydrocarbonaceous material is burned with an oxygen containing gas and returning the regenerated catalyst to the reaction zone.

10. A hydroforming process which comprises contacting a light hydrocarbon oil with a dense fluidized mass of finely divided solid reforming catalytic material in a reaction zone at a pressure of at least about 30 p.s.i.g., thus contaminating the catalyst with volatile and non-volatile hydrocarbonaceous material, withdrawing the contaminated catalyst directly from the lower portion of the dense mass in said reaction zone and passing the same upwardly as a lean suspension in a gaseous material at a linear velocity of at least about 10 feet per second in a substantially vertical elongated confined zone within said reaction zone at a point below the entry of the hydrocarbon oil thereto, passing the contaminated catalyst from the elongated confined zone to a stripping zone positioned above said reaction zone, stripping volatile material from the catalyst as a dense fluidized mass in the stripping zone, withdrawing a portion of the stripped catalyst directly from the dense mass in said stripping zone and passing the same downwardly as a dense fluidized mass to a regeneration zone, burning with an oxygen containing gas at least part of the hydrocarbonaceous material from the catalyst as a dense fluidized mass in the regeneration zone, and withdrawing a portion of the regenerated catalyst directly from the dense mass in the regeneration zone and passing the same as a dense fluidized mass to the reaction zone.

11. A process of claim 10 wherein the contaminated catalyst is passed upwardly in said elongated confined zone at a linear velocity of about 15 to about 60 feet per second and the contaminated catalyst is stripped by means of steam in the stripping zone.

12. A hydroforming process which comprises contacting a light hydrocarbon oil with a dense fluidized mass of finely divided solid hydroforming catalyst in a reaction zone at a pressure of about 30 to about 1000 p.s.i.g., a temperature of about 850° to about 1075° F., a weight space velocity of about 0.5 to 5, a catalyst to oil ratio of about 0.01 to about 3 and in the presence of added hydrogen in the amount of about 1000 to about 10,000 s.c.f.b., said conditions being selected to provide a net production of hydrogen, thus the catalyst is contaminated with volatile and non-volatile hydrocarbonaceous material, withdrawing vaporous reaction product from said reaction zone and separating therefrom a normally gaseous product material containing hydrogen, withdrawing contaminated catalyst directly from the lower portion of the dense mass in said reaction zone and passing the same upwardly as a lean suspension in a portion of the normally gaseous product material at a linear velocity of about 10 to about 100 feet per second in a substantially vertical elongated confined zone within said reaction zone at a point below the entry of the hydrocarbon oil thereto, passing the contaminated catalyst from the elongated confined zone to a stripping zone positioned above said reaction zone, stripping volatile material from the catalyst as a dense fluidized mass in the stripping zone, withdrawing a portion of the stripped catalyst directly from the dense mass in said stripping zone and passing the same downwardly as a dense fluidized mass to a separate regeneration zone situated adjacent to said reaction zone, burning with an oxygen containing gas at least part of the hydrocarbonaceous material from the catalyst as a dense fluidized mass in the regeneration zone and withdrawing a portion of the regenerated catalyst directly from the dense mass in the regeneration zone and passing the same as a dense fluidized mass to the reaction zone.

13. An apparatus comprising in combination a vertical cylindrical reactor, a vertical cylindrical stripper superimposed on said reactor and of smaller cross-sectional area relative thereto, a vertical cylindrical conduit within the reactor having its upper end in open communication with the stripper and the lower end positioned within the lower portion of the reactor, a separate vertical cylindrical regenerator situated adjacent to said reactor, a first transfer means interconnecting the stripper with said regenerator, a second transfer means interconnecting the regenerator with said reactor and gaseous inlet means for the introduction of gaseous material to said reactor, regenerator and stripper.

14. The apparatus of claim 13 wherein the second transfer means is a conduit containing a U-bend adapted to transfer solid material from the bottom part of said regenerator to the bottom part of said reactor.

15. The apparatus of claim 13 wherein the first transfer means is a conduit containing a U-bend adapted for the transfer of finely divided solid material from the bottom of said stripper to the middle section of said regenerator and the second transfer means is a conduit containing a U-bend adapted for the transfer of finely divided solid material from the bottom part of said regenerator to the bottom part of said reactor.

16. A chemical process which comprises injecting a gaseous reactant into a fluidized mass of finely divided solid material under suitable reaction conditions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion with an oxygen containing gas, and passing regenerated solids to the reaction zone.

17. A chemical process which comprises injecting a gaseous reactant into a fluidized mass of finely divided solid material under suitable reaction conditions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion with an oxygen containing gas, maintaining the solids in the reaction zone between the point of entry of the gaseous reactant thereto and the point of withdrawal of contaminated solids therefrom at a temperature greater than the average temperature in the reaction zone, and passing regenerated solids to the reaction zone.

18. A chemical process which comprises injecting a gaseous reactant into a fluidized mass of finely divided solid material under suitable reaction conditions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion with an oxygen containing gas, and passing regenerated solids to the reaction zone at a point above the entry of reactant gas thereto.

19. A chemical process which comprises injecting a gaseous reactant into a fluidized mass of finely divided solid material under suitable reaction conditions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion with an oxygen containing gas, maintaining the solids in the reaction zone between the point of entry of the gaseous reactant thereto and the point of withdrawal of contaminated solids therefrom at a temperature greater than the average temperature in the reaction zone, and passing regenerated solids to the reaction zone at a point above the entry of gaseous reactant thereto at a temperature greater than the temperature in the reaction zone.

20. A chemical process which comprises injecting a gaseous reactant into a fluidized mass of finely divided solid material under suitable reaction condtions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas which is at a lower temperature than the solids to an elevated zone, disengaging the lift gas from the contaminated solids thereby decreasing the volatile combustible material originally associated therewith, contacting the disengaged contaminated solids with a stripping gas to remove additional volatile combustible material originally associcted therewith, passing the stripped solids to a regeneration zone wherein at least part of the combustible material on the solids is removed by combustion with an oxygen containing gas, and passing regenerated solids to the reaction zone.

21. A chemical process which comprises injecting a gaseous reactant into a fluidized mass of finely divided solid material under suitable reaction conditions in a reaction zone thereby producing a reaction product and contaminating the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion with an oxygen containing gas, passing regenerated solids to the reaction zone at a point above the entry of reactant gas thereto, and separating the reaction product from the mass of solids such that only a relatively small quantity of solids is entrained therewith, passing the reaction product containing entrained solids to a separating zone wherein substantially all of the solids are recovered therefrom, and passing recovered solids to the middle section of the mass of solids in the reaction zone in order to avoid substantially classification of the solids therein.

22. A chemical process which comprises injecting a gaseous reactant into the bottom part of a dense fluid bed of finely divided catalytic solids in the reaction zone under suitable reaction conditions to produce a reaction product and contaminate the solids with volatile and non-volatile combustible material, passing a portion of the contaminated solids from the reaction zone into the bottom of a vertically elongated confined zone located partially within the reaction zone, at a point below the entry of the reactant gas thereto, and passing the solids upwardly in the elongated confined zone as a suspension in a lift gas to an elevated zone, disengaging the lift gas from the contaminated solids thereby decreasing the volatile combustible material originally associated therewith, contacting the disengaged contaminated solids with a stripping gas to remove additional volatile combustible material originally associated therewith, passing the stripped solids to a regeneration zone wherein at least part of the combustible material on the solids is removed by combustion, passing regenerated solids to the reaction zone, and passing a gas into the bottom of the dense fluid bed of the reaction zone at a point below the point of withdrawal of contaminated solids therefrom whose temperature is greater than the average temperature of the fluid bed in order to maintain an average temperature in the zone between the point of introduction of the reactant gas and the point of withdrawal of the contaminated solids which is greater than the average temperature of the fluid bed.

23. A hydroforming process which comprises injecting a vaporous naphtha fraction into the lower part of a dense fluid bed of finely divided hydroforming catalyst in a reaction zone under suitable reforming conditions including the presence of added hydrogen to produce a reformed product and contaminate the catalyst with volatile hydrocarbons and carbonaceous material, passing contaminated catalyst from the reaction zone into the bottom of a vertically elongated confined zone located partially within the reaction zone, at a point below the entry of naphtha thereto, and passing the catalyst upwardly as a suspension in a lift gas in the elongated confined zone to an elevated zone, disengaging the lift gas from the catalyst thereby decreasing the volatile hydrocarbon originally associated therewith, contacting the disengaged catalyst with a stripping gas to remove further any volatile hydrocarbons originally associated therewith, passing the stripped catalyst to a regeneration zone wherein at least part of the carbonaceous material is removed by combustion with an oxygen containing gas, reducing the catalyst passing regenerated and reduced catalyst to the reaction zone, and passing hydrogen containing gas to the reaction zone below the point of contaminated catalyst withdrawal in order that said hydrogen containing gas can serve to strip volatile hydrocarbons from the contaminated catalyst being withdrawn.

24. The process of claim 23 wherein the hydrogen containing gas being introduced into the reaction zone below the point of withdrawal of contaminated catalyst is at a higher temperature than the average temperature of the catalyst bed in the reaction zone.

25. The process of claim 23 wherein the regenerated catalyst is passed to the reaction zone at a point above the entry of vaporous naphtha thereto.

26. The process of claim 23 wherein the hydrogen containing gas is introduced below the point of withdrawal of contaminated catalyst at a temperature of about 1000° to about 1400° F. such that the catalyst in the zone between the point of introducing vaporous naphtha and the point of withdrawal of contaminated catalyst is at a temperature of about 1000° to about 1250° F. and said temperature is greater than the temperature of the catalyst bed in the reaction zone.

27. A hydroforming process which comprises injecting a vaporous naphtha fraction having a temperature of about 950° to about 1050° F. directly into the lower part of an elongated dense fluid bed of finely divided reforming catalyst in a reaction zone under suitable reforming conditions including a reaction temperature of about 850° to about 1075° F. and in the presence of added hydrogen, thereby a reformed product is obtained including a normally gaseous material containing hydrogen and the catalyst is contaminated with volatile and non-volatile combustible material, passing contaminated catalyst having a temperature of about 1000° to about 1250° F. from the reaction zone into the bottom of the vertically elongated confined zone located partially within the reaction zone, at a point below the point of introduction of vaporous naphtha thereto, and passing the catalyst upwardly in the elongated confined zone as a suspension in a lift gas to an elevated zone, disengaging the lift gas from the contaminated catalyst thereby decreasing the volatile combustible material originally associated therewith, contacting the disengaged contaminated solids with the stripping gas to remove additional volatile combustible material originally associated therewith, passing the stripped catalyst to a regeneration zone wherein at least part of the combustible material is burned by means of an oxygen containing gas at a temperature greater than the reaction temperature, reducing the catalyst passing regenerated and reduced catalyst at a temperature greater than the reaction temperature to the lower part of the catalyst bed in the reaction zone, separating the normally gaseous material containing hydrogen from the reformed product, and heat at least a portion of the hydrogen containing gas to a temperature of about 1000° to about 1400° F. and passing the same to the reaction zone at a point below the point of withdrawal of contaminated catalyst therefrom.

28. The process of claim 27 wherein the reforming catalyst is a molybdenum oxide catalyst.

References Cited in the file of this patent

UNITED STATES PATENTS

| | | |
|---|---|---|
| 2,447,116 | Collins | Aug. 17, 1948 |
| 2,529,583 | Adams | Nov. 14, 1950 |
| 2,595,909 | Trainer et al. | May 6, 1952 |
| 2,658,822 | Hengstebeck | Nov. 10, 1953 |
| 2,689,823 | Hardy et al. | Sept. 21, 1954 |